(12) United States Patent
Chou et al.

(10) Patent No.: US 12,499,965 B2
(45) Date of Patent: Dec. 16, 2025

(54) MEMORY DEVICE AND READ METHOD ADJUSTING MULTIPLE BIT LINE VOLTAGES FOR ERROR MITIGATION READING

(71) Applicant: MACRONIX International Co., Ltd., Hsinchu (TW)

(72) Inventors: You-Liang Chou, Taichung (TW); Wen-Jer Tsai, Hualien County (TW)

(73) Assignee: MACRONIX International Co., Ltd., Hsinchu (TW)

( * ) Notice: Subject to any disclaimer, the term of this patent is extended or adjusted under 35 U.S.C. 154(b) by 133 days.

(21) Appl. No.: 18/403,726

(22) Filed: Jan. 4, 2024

(65) Prior Publication Data

US 2025/0014671 A1    Jan. 9, 2025

Related U.S. Application Data

(60) Provisional application No. 63/524,852, filed on Jul. 3, 2023.

(51) Int. Cl.
*G11C 29/52* (2006.01)
*G11C 7/12* (2006.01)
(Continued)

(52) U.S. Cl.
CPC .............. *G11C 29/52* (2013.01); *G11C 7/12* (2013.01); *G11C 11/4094* (2013.01);
(Continued)

(58) Field of Classification Search
CPC . G11C 29/52; G11C 11/4094; G11C 13/0026; G11C 16/24; G11C 16/26;
(Continued)

(56) References Cited

U.S. PATENT DOCUMENTS 9,570,189 B1 * 2/2017 Lee .................... G06F 11/1068
2021/0118518 A1 * 4/2021 Wu ........................ G11C 29/38

FOREIGN PATENT DOCUMENTS

CN           104126205           3/2017

OTHER PUBLICATIONS

"Office Action of Taiwan Counterpart Application", issued on Oct. 23, 2024, p. 1-p. 8.
(Continued)

*Primary Examiner* — Donald H B Braswell
(74) *Attorney, Agent, or Firm* — J.C. PATENTS

(57) ABSTRACT

A memory device and a read method therefor are disclosed. The memory device includes first to third memory cell strings. The memory device is a three-dimensional NAND flash memory with high capacity and high performance. Each of the memory cell strings includes first to third memory cells. The read method includes: performing a first read operation of the memory device to the second memory cell in the second memory cell string, the first read operation includes applying a first bit line voltage to a first bit line, a second bit line, and a third bit line; in response to the failure of the first read operation, performing a second read operation of the memory device, the second read operation includes: applying a set of second bit line voltages to the first bit line, the second bit line and the third bit line.

20 Claims, 10 Drawing Sheets

(51) Int. Cl.
　　　*G11C 11/4094*　　(2006.01)
　　　*G11C 13/00*　　　(2006.01)
　　　*G11C 16/24*　　　(2006.01)
　　　*G11C 16/26*　　　(2006.01)
　　　*G11C 29/42*　　　(2006.01)

(52) U.S. Cl.
　　　CPC .......... *G11C 13/0026* (2013.01); *G11C 16/24* (2013.01); *G11C 16/26* (2013.01); *G11C 29/42* (2013.01)

(58) Field of Classification Search
　　　CPC . G11C 29/42; G11C 11/5642; G11C 16/0483; G11C 16/08; G11C 8/08; G11C 7/12
　　　See application file for complete search history.

(56) References Cited

OTHER PUBLICATIONS

Yu Cai et al., "Data retention in MLC NAND flash memory: Characterization, optimization, and recovery", 2015 IEEE 21st International Symposium on High Performance Computer Architecture (HPCA), Feb. 2015, pp. 1-13.

Hanshui Fan et al., "Adaptive Bitline Voltage Countermeasure for Neighbor Wordline Interference in 3D NAND Flash Memory-Based Sensors", Sensors, Mar. 2023, pp. 1-18.

\* cited by examiner

MEMORY DEVICE AND READ METHOD ADJUSTING MULTIPLE BIT LINE VOLTAGES FOR ERROR MITIGATION READING

CROSS-REFERENCE TO RELATED APPLICATION

This application claims the priority benefit of U.S. patent application Ser. No. 63/524,852, filed on Jul. 3, 2023. The entirety of the above-mentioned patent application is hereby incorporated by reference herein and made a part of this specification.

BACKGROUND

Field of the Disclosure

The present disclosure relates to a memory cell read technology applied to NAND flash memory, and in particular to a memory device and a read method therefor.

Description of Related Art

High-capacity and high-performance integrated circuit memories including three-dimensional (3D) NAND flash memory are developed continuously. 3D stacking technology and triple-level cells (TLC) are adopted in hope of reducing the size of memory cells and increase data storage density.

Currently, there is still room for improvement in the data retention capabilities of three-dimensional flash memory. When accessing data in three-dimensional flash memory, the more bits a triple-level memory cell can store, the more likely it is that errors will occur. Reliability of data storage may also be affected due to the increase in the number of program/erase cycles. Even if error correcting codes (ECC) are adopted to maintain the reliability of stored data, the use of complex debugging codes will significantly increase the layout area and increase costs. Therefore, how to reduce the raw bit error rate (RBER) of three-dimensional flash memory and improve its reliability is one of the main issue to be explored in the field of three-dimensional flash memory.

SUMMARY

The present disclosure provides a memory device and a read method therefor, which increase the success rate of the read operation by changing the bit line voltages, and improve the data reliability of the memory device.

The read method for a memory device of the present disclosure is applicable to a memory device. The memory device includes a first memory cell string, a second memory cell string and a third memory cell string. The second memory cell string is between the first memory cell string and the third memory cell string. Each of the first memory cell string, the second memory cell string, and the third memory cell string includes a first memory cell, a second memory cell, and a third memory cell connected in series. The second memory cell is between the first memory cell and the third memory cell. The read method includes: performing a first read operation of the memory device comprising: applying the first bit line voltage to the first bit line, the second bit line and the third bit line, the first bit line, the second bit line and the third bit line are respectively connected to the first memory cell string, the second memory cell string, and the third memory cell string; and in response to a failure of the first read operation, performing a second read operation of the memory device comprising: applying a set of second bit line voltages to the first bit line, the second bit line and the third bit line respectively, and the set of second bit line voltages includes a third bit line voltage, a fourth bit line voltage and a fifth bit line voltage respectively applied to the first bit line, the second bit line and the third bit line, and the third bit line voltage and the fifth bit line voltage are different from the first bit line voltage.

The memory device of the present disclosure includes a memory array and a memory controller. The memory array includes a first memory cell string, a second memory cell string, and a third memory cell string. The second memory cell string is between the first memory cell string and the third memory cell string. Each of the first memory cell string, the second memory cell string and the third memory cell string includes a first memory cell, a second memory cell and a third memory cell connected in series, and the second memory cell is between the first memory cell and the third memory cell. The memory controller is configured to control the memory array. The memory controller is configured to perform: a first read operation of the memory device, and the first read operation comprising: applying the first bit line voltage to the first bit line, the second bit line and the third bit line, and the first bit line, the second bit line and the third bit line are respectively connected to the first memory cell string, the second memory cell string and the third memory cell string; and in response to a failure of the first read operation, perform a second read operation of the memory device comprising: applying a set of second bit line voltages to the first bit line, the second bit line and the third bit line respectively, and the set of second bit line voltages includes a third bit line voltage, a fourth bit line voltage, and a fifth bit line voltage respectively applied to the first bit line, the second bit line and the third bit line, and the third bit line voltage and the fifth bit line voltage are different from the first bit line voltage.

Based on the above, the memory device and the read method therefor described in the embodiments of the present disclosure determine whether the data retention function of the target memory cells is normal through the first read operation, and when the first read operation fails, bit line voltages of the target memory cells and adjacent memory cells are changed by performing a second read operation, so as to adjust the threshold voltage distribution curve in the target memory cells and increase the success rate of the first read operation, thereby improving data reliability of the non-volatile memory device (e.g., flash memory).

DETAILED DESCRIPTION OF DISCLOSED EMBODIMENTS

Figure 1:
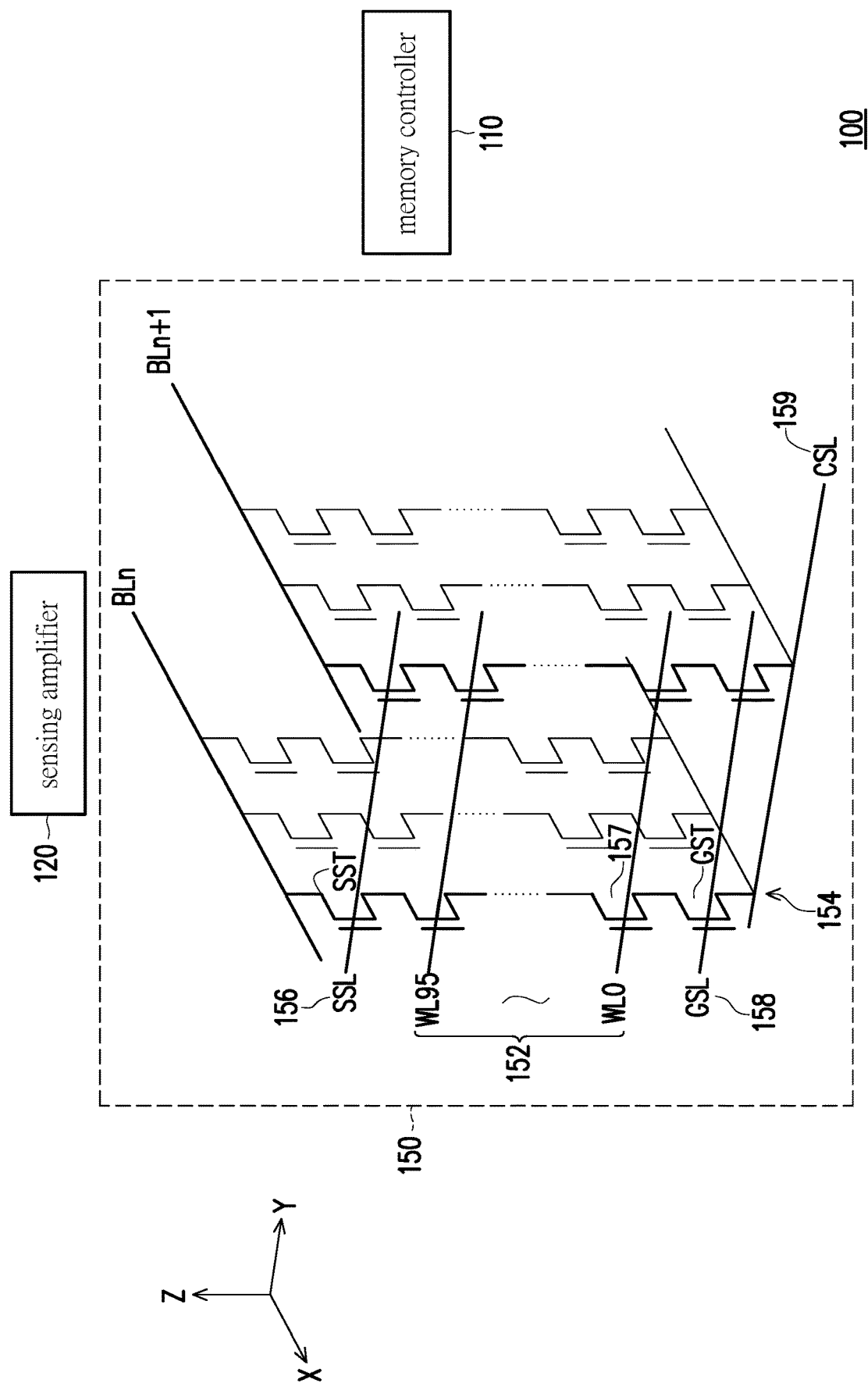
FIG. 1 is a schematic structural diagram of a memory device according to an embodiment of the present disclosure.

FIG. 1 is a schematic structural diagram of a memory device 100 according to an embodiment of the present disclosure. The memory device 100 of this embodiment may be the three-dimensional memory shown in FIG. 1, for example, a NAND cache memory device. The memory device 100 includes a memory array, a memory controller 110 and a sensing amplifier (SA) 120. The three-dimensional block 150 in the three-dimensional memory chip represents a portion of the memory array. The memory controller 110 is configured to control the memory array and corresponding hardware (such as voltage drivers, sensing amplifiers, scan drivers, etc.) and implement steps in the embodiments of the present disclosure.

Multiple memory cells in the three-dimensional block 150 are configured in three dimensions (for example, XYZ coordinate system). Taking the memory cell 157 as an example, the memory cell 157 is coupled to the corresponding word line WL0 and bit line BLn. Word lines (e.g., word lines WL0~WL95) are formed by corresponding conductive layers. The memory cells in the memory block 150 are divided into multiple pages 152. Each page 152 may be, for example, a layer of memory cells in the XY plane. The memory cells on the same layer (the same page) may be coupled to a same word line (e.g., word line WL95) and obtain a same corresponding word line voltage. The memory cells on the different layers (different pages) may be coupled to different word lines (e.g., word line WL0 and WL95) and obtain different corresponding word line voltages. Each page 152 may be connected to the corresponding contact point in the drive circuit, for example to the X decoder (or scan driver). Each word line has a corresponding voltage driver, and these voltage drivers may be controlled by the memory controller 110 or corresponding hardware. Multiple memory cells in the memory cell string 154 belong to different pages.

The memory cell string (e.g., string 154) includes a plurality of memory cells connected in series vertically along the Z direction. The memory cells are configured as string selection transistors SST coupled to string selection line SSL 156, and memory cells may also be configured as ground selection transistors GST coupled to ground selection line GSL 158. The string 154 is connected to one or more drives, such as data drives. The string 154 including memory cell 157 is connected to common source line CSL 159 through the ground selection transistor GST. SSL 156 may be a conductive line or a conductive layer formed on top of each page 152 (or word line layer). Each memory cell string (e.g., string 154) is connected to a corresponding bit line (e.g., bit line BLn). The sensing amplifier 120 is coupled to the corresponding bit line to read the voltage on the bit line, and uses the potential state and threshold voltage value corresponding to the memory cell to be read and located on the bit line to determine the data in the memory cell. Block 150 may include multiple SSLs 156 provided over the top of each memory string 154 or over the top of the topmost page 152. GSL 158 may be a conductive line or a conductive layer formed under the bottom of each memory string 154 or under the bottom of the bottommost page 152. CSL 159 may be a conductive layer or a plurality of conductive lines formed below the GSL 158 on a substrate of a stereoscopic memory chip. Several dummy lines or corresponding layers (not shown) may also be provided between the string selection line SSL 156 and the topmost page 152, or between the ground selection line GSL 158 and the bottommost page 152.

Figure 2:
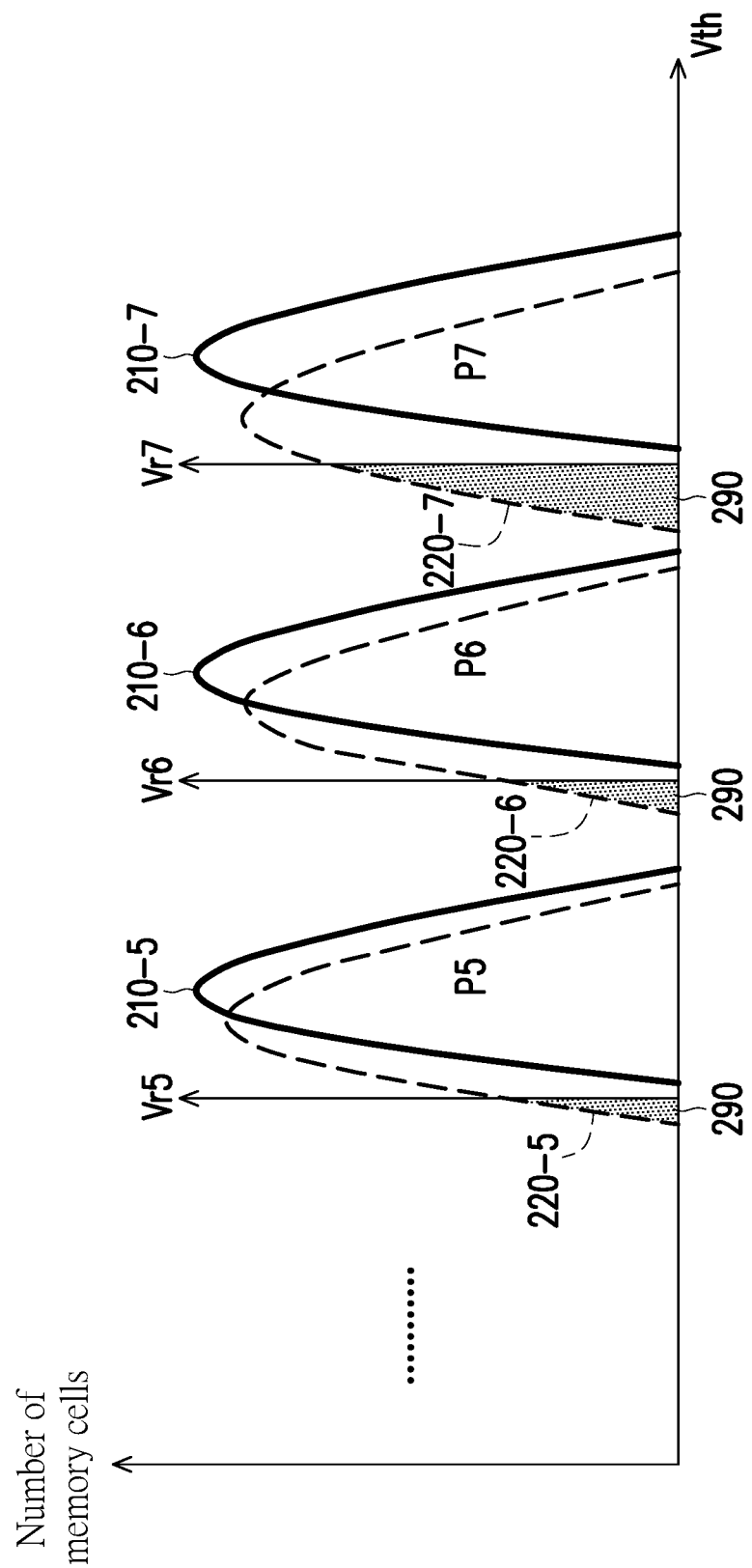
FIG. 2 is a partial schematic diagram of an example in which triple-level cells (TLC) to illustrate shifting of a threshold voltage distribution curve in an embodiment.

FIG. 2 is a partial schematic diagram of an example in which a triple Level Cell (TLC) to illustrate shifting of a threshold voltage distribution curve. For example, the potential states of TLC may be divided into erasure potential state Er (also referred to as potential state P0) and potential states P1 to P7. Moreover, it is known from experiments that different potential states in the TLC may shift by different threshold voltages after programmed, the shifting amount of a threshold voltage distribution curve corresponding to each potential state also varies. In this embodiment, the erasure potential state Er (also known as the potential state P0) and the potential state P1 are classified into the low-level group potential state LPS. The potential states P2 to P4 are classified into the middle-level group potential state MPS. The potential states P5 to P7 are classified into the high-level group potential state HPS. The low-level group potential state LPS, the middle-level group potential state MPS and the high-level group potential state HPS have different threshold voltages. FIG. 2 presents potential states P5 to P7 in the high-level group potential state HPS and their corresponding threshold voltage distribution curves. The X-axis in FIG. 2 represents the magnitude of the threshold voltage, and the Y-axis in FIG. 2 represents the number of memory cells in the corresponding potential states P5 to P7. Three threshold voltage distribution curves are illustrated in FIG. 2. The threshold voltage distribution curves 210-5 to 210-7 presented by the solid lines in FIG. 2 are the threshold voltage distribution curves corresponding to the potential states P5 to P7 when the memory device has an initial threshold voltage (for example, a memory device that has just been shipped from the factory). The threshold voltage distribution curves 210-5 to 210-7 may be clearly distinguished based on the reference voltages Vr5 to Vr7. The threshold voltage distribution curves 220-5 to 220-7 shown by the dashed lines in FIG. 2 are the threshold voltage distribution curves corresponding to the potential states P5 to P7 after the threshold voltage of the memory device shifts (the cause may be a large amount of program/erase cycles (P/E cycle) or other factors). Due to the shift of the threshold voltage, if the threshold voltage distribution curves 220-5 to 220-7 are still classified based on the reference voltages Vr5 to Vr7, there is a chance that the data will retain error (such as the three areas indicated by the arrow 290), and the higher the level of potential states P5 to P7 is (for example, potential state P7 is a high-level potential state; potential state P5 is a lower-level potential state relative to potential state P7), the higher probability of data error is. On the other hand, the shift of the threshold voltage not only reduces the voltage values of the threshold voltage distribution curves corresponding to these potential states (e.g., the threshold voltage distribution curves corresponding to potential states P3-P7), but it may also increase the voltage values of the threshold voltage distribution curves corresponding to these potential states (e.g., the threshold voltage distribution curves corresponding to potential states Er, P1-P2).

Embodiments of the present disclosure utilize the practice of changing the bit line voltage in the second read operation to adjust the threshold voltage distribution curve of the target memory cells, thereby increasing the success rate of the target memory cells for the read operation, thereby improving data reliability of non-volatile memory devices (e.g., flash memory). In detail, the embodiment of the present disclosure performs a first read operation on specific memory cells (which means memory cells of a specific page or memory cells in a specific word line), and adjusts at least two bit line (BL) voltages in the flash memory device by performing a second read operation when the first read operation fails, so as to correspondingly adjust the threshold voltage distribution curve of the target memory cells. The performing of the second read operation to the target memory cells adjusts the threshold voltage distribution curve (e.g. shifting the threshold voltage distribution curve towards a higher threshold voltage or a lower threshold voltage). The success rate of the target memory cells is increased in the second read operation. There are various embodiments for adjusting the threshold voltage distribution curve of the target memory cells by changing the bit line (BL) voltages in the flash memory device, which will be described in details below.

Figure 3:
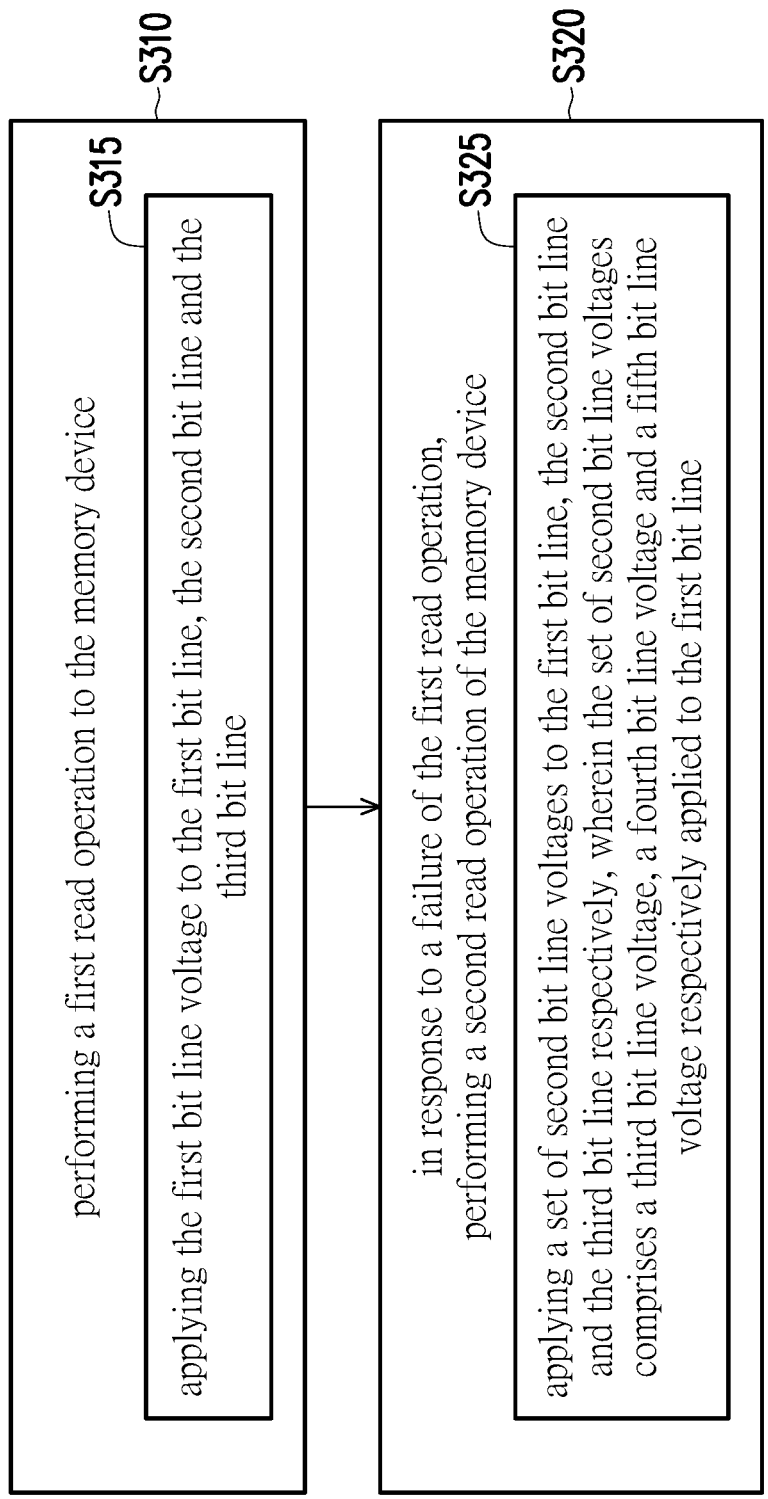
FIG. 3 is a flowchart of a read method for a memory device according to an embodiment of the present disclosure.
Figure 4:
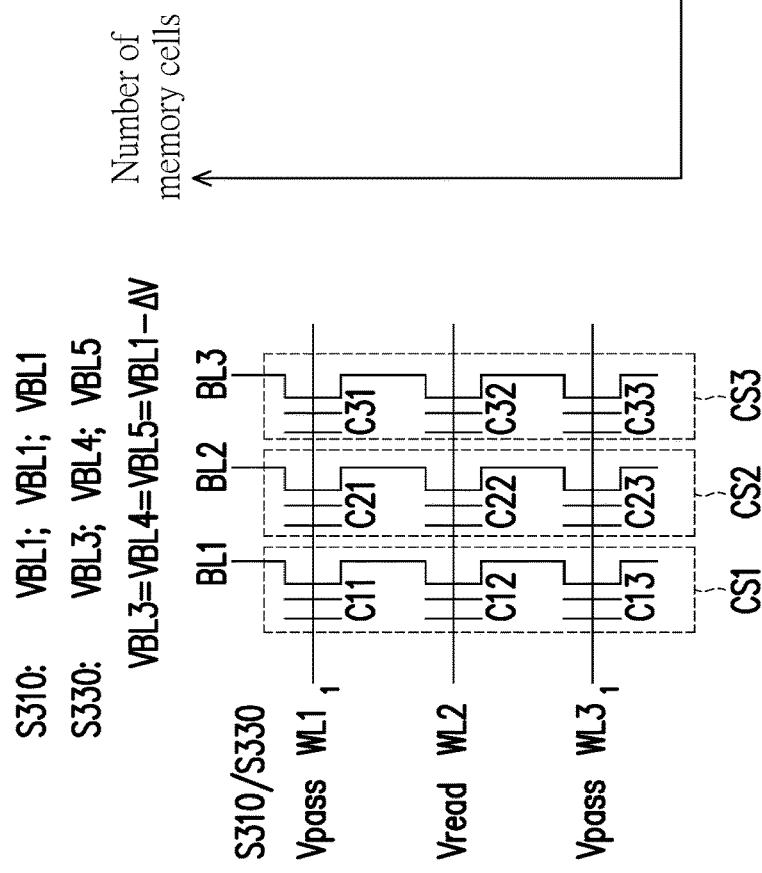
FIG. 4 is a schematic diagram of a part of the memory array in a memory device according to the first embodiment of the present disclosure.

FIG. 3 is a flowchart of a read method for a memory device according to an embodiment of the present disclosure. FIG. 4 is a schematic diagram of a part of the memory array in a memory device according to the first embodiment of the present disclosure. The read method is applicable to the memory device 100 of FIG. 1 and the memory array shown in FIG. 4. For convenience of illustration, some elements of the memory array in FIG. 4 are omitted, and mainly present three memory cell strings CS1~CS3, memory cells C11~C33 in the memory cell strings CS1~CS3, word lines WL1~WL3 and bit lines BL1~BL3. The memory cell strings CS1~CS3 may be memory cell strings at any position in the memory array. In other words, the memory device 100 includes a first memory cell string CS1, a second memory cell string CS2, and a third memory cell string CS3 connected in series. The memory cell string CS2 is between the first memory cell string CS1 and the third memory cell string CS3. Each of the first memory cell string CS1, the second memory cell string CS2, and the third memory cell string CS3 includes first memory cells C11~C31, second memory cells C12~C32, and third memory cells C13~C33. The second memory cell (e.g., memory cell C22) in each memory cell string is between the first memory cell (e.g., memory cell C21) and the third memory cell (e.g., memory cell C23).

Please refer to FIG. 3 and FIG. 4 at the same time. In step S310, the memory controller 110 of FIG. 1 performs the first read operation of the memory device 100. The steps of the first read operation include a step S315: applying the first bit line voltage VBL1 to the first bit line BL1, the second bit line BL2 and the third bit line BL3. The first bit line BL1, the second bit line BL2 and the third bit line BL3 are respectively connected to the first memory cell string CS1, the second memory cell string CS2 and the third memory cell string CS3.

The steps of the first read operation further include: applying a read voltage Vread to the second word line WL_2 connected to the second memory cell (e.g., second memory cells C12, C22 and C32) in each of the memory cell strings CS1, CS2 and CS3; and, applying a pass voltage Vpass to a first word line WL_1 and a third word line WL_3 respectively connected to the first memory cell (e.g., first memory cells C11, C21 and C31) and the third memory cells (e.g., third memory cells C13, C23 and C33) in each of the memory cell strings CS1, CS2 and CS3.

In step S320, in response to a failure of the first read operation in step S310, the operation proceeds from step S310 to step S320, and the memory controller 110 performs a second read operation of the memory device. In detail, the steps of the second read operation include a step S325: applies a set of second bit line voltages to the first bit line BL1, the second bit line BL2 and the third bit line BL3, respectively, in the step S325. The set of second bit line voltages includes a third bit line voltage VBL3, a fourth bit line voltage VBL4 and a fifth bit line voltage VBL5, which are applied to the first bit line BL1, the second bit line BL2 and the third bit line BL3 respectively. The third bit line voltage VBL3 and the fifth bit line voltage VBL5 are different from the first bit line voltage VBL1 in the first read operation.

The steps of the second read operation further include: applying a read voltage Vread to the second word line WL_2 connected to the second memory cell (e.g., second memory cells C12, C22 and C32) in each of the memory cell strings CS1, CS2 and CS3; and, applying a pass voltage Vpass to a first word line WL_1 and a third word line WL_3 respectively connected to the first memory cell (e.g., first memory cells C11, C21 and C31) and the third memory cells (e.g., third memory cells C13, C23 and C33) in each of the memory cell strings CS1, CS2 and CS3.

After the second read operation of step S320, the threshold voltage distribution curve of the target memory cells (e.g., the second memory cells C12, C22 and C32) are adjusted thereby increasing the success rate of the target memory cells for the read operation and improving data reliability of non-volatile memory devices (e.g., flash memory). There are various embodiments for the second read operation of step S320, which are described in details in the following and corresponding figures.

Figure 5:
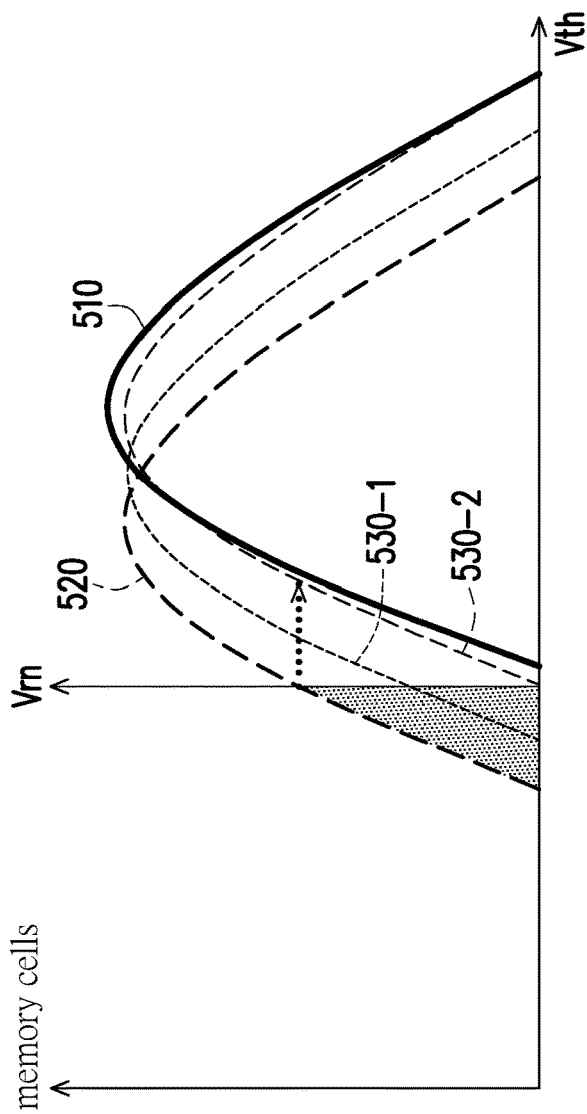
FIG. 5 is a schematic diagram of a threshold voltage distribution curve corresponding to memory cells C12, C22, and C32 according to the first embodiment of the present disclosure.

FIG. 5 is a schematic diagram of a threshold voltage distribution curve corresponding to memory cells C12, C22, and C32 according to the first embodiment of the present disclosure. Please refer to FIG. 4 and FIG. 5 at the same time. In the first embodiment, the step S320 of FIG. 3 is implemented as follows, that is, when the second read operation is performed, voltages (i.e., the third bit line voltage VBL3, the fourth bit line voltage VBL4 and the fifth bit line voltage VBL5) in the set of second bit line voltages applied uniformly to the first bit line BL1, the second bit line BL2, and the third bit line BL3 are all the same. Moreover, voltages in the set of second bit line voltages are all lower than the first bit line voltage VBL1. In other words, taking the third bit line voltage VBL3 as an example, the third bit line voltage VBL3 is the first bit line voltage VBL1 minus the voltage difference ΔV. Voltages in the set of second bit line voltages are not equal to the first bit line voltage VBL1. In the foregoing situation, the threshold voltage of the second memory cell C22 in the second memory cell string CS2 is increased due to the step S320, and the threshold voltages of the memory cells C12 and C32 are also increased.

In FIG. 5, the threshold voltage distribution curve 510 used to present the initial threshold voltage and illustrated as a solid line is located on the right side of the reference voltage Vrn, but the threshold voltage distribution curve 520 shown in FIG. 5 and illustrated as dashed lines after being shifted by the threshold voltage is partially located on the left side of the reference voltage Vrn; n is a positive integer, and n is used to represent the level of the potential state. For example, the level of potential state P1 is n=1, the level of potential state P2 is n=2, and so on. The threshold voltage distribution curve of the potential state Pn is mainly located between the reference voltage Vrn and the reference voltage Vrn+1. In this embodiment, when performing the first read operation and the second read operation in the step S320, the voltages of the word lines WL1 to WL3 are the same as the voltages of the read operation in step S310, and the bit lines BL1 to BL3 are adjusted, thereby adjusting the threshold voltages of the second memory cells C12, C22, and C32.

Specifically, in the first read operation, a read voltage Vread is applied to the second word line WL2 connected to the second memory cell C12, C22, C32 in each memory cell string (for example, the first to third memory cell strings CS1~CS3), and a pass voltage Vpass is applied to the first word line WL1 connected to the first memory cells C11, C21, and C31 in each memory cell string. The pass voltage Vpass is applied to the third word line WL3 connected to the first memory cells C13, C23, and C33 in each memory cell string. In the second read operation, the read voltage Vread is applied to the second word line WL2 connected to the second memory cell C12, C22, C32 in each memory cell string (for example, the first to third memory cell strings CS1~CS3), and the pass voltage Vpass is applied to the first word line WL1 connected to the first memory cells C11, C21, and C31 in each memory cell string. The pass voltage Vpass is applied to the third word line WL3 connected to the first memory cells C13, C23, and C33 in each memory cell string.

In this case, the threshold voltage distribution curves (corresponding to the threshold voltage distribution curve 520 in FIG. 5) of the target memory cells (e.g., second memory cells C12, C22, and C32) will be improved accordingly, for example, gradually improved from the threshold voltage distribution curve 520 in FIG. 5 to the adjusted threshold voltage distribution curve 530-1 in FIG. 5, and may be raised to the adjusted threshold voltage distribution curve 530-2 in FIG. 5 after multiple adjustments. Under the circumstances, the adjusted threshold voltage distribution curve 530-2 are all located to the right of the reference voltage Vrn. The step S320 of this embodiment may be executed multiple times, and the threshold voltages of the second memory cells C12, C22, and C32 are gradually adjusted until approaching the threshold voltage distribution curve 530-2 in FIG. 5 to make the read operation in repeatedly performed step S310 to be successful. The value of the voltage difference ΔV in this embodiment may be obtained based on the experience of those who apply this embodiment and statistically compiled data.

Figure 7:
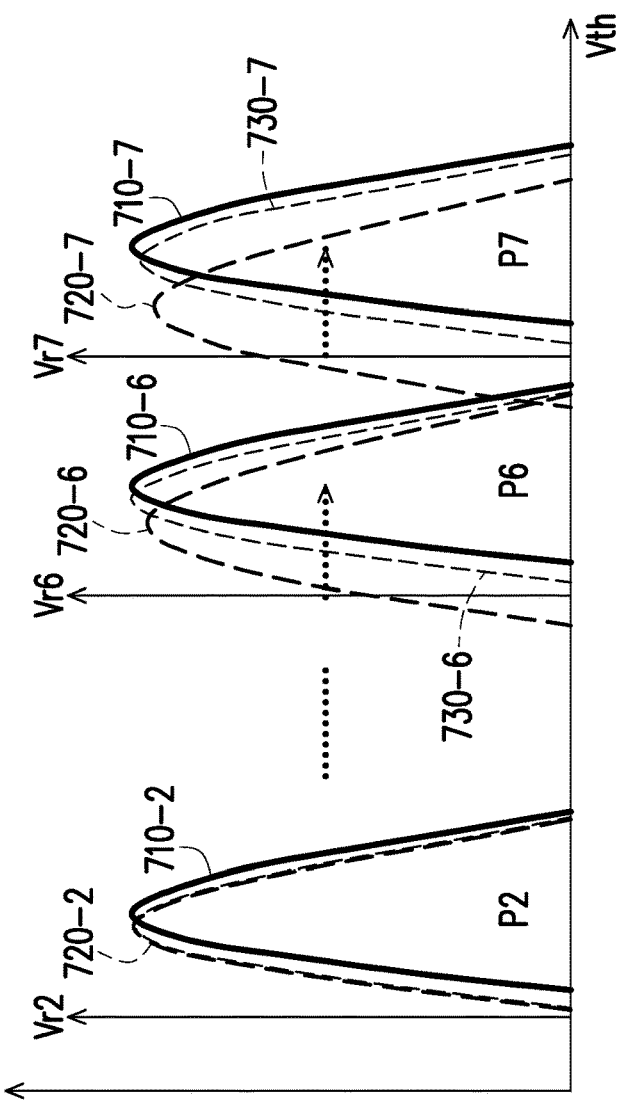
FIG. 7 is a schematic diagram of a threshold voltage distribution curve corresponding to memory cells C12, C22, and C32 according to the second embodiment of the present disclosure.
Figure 6:
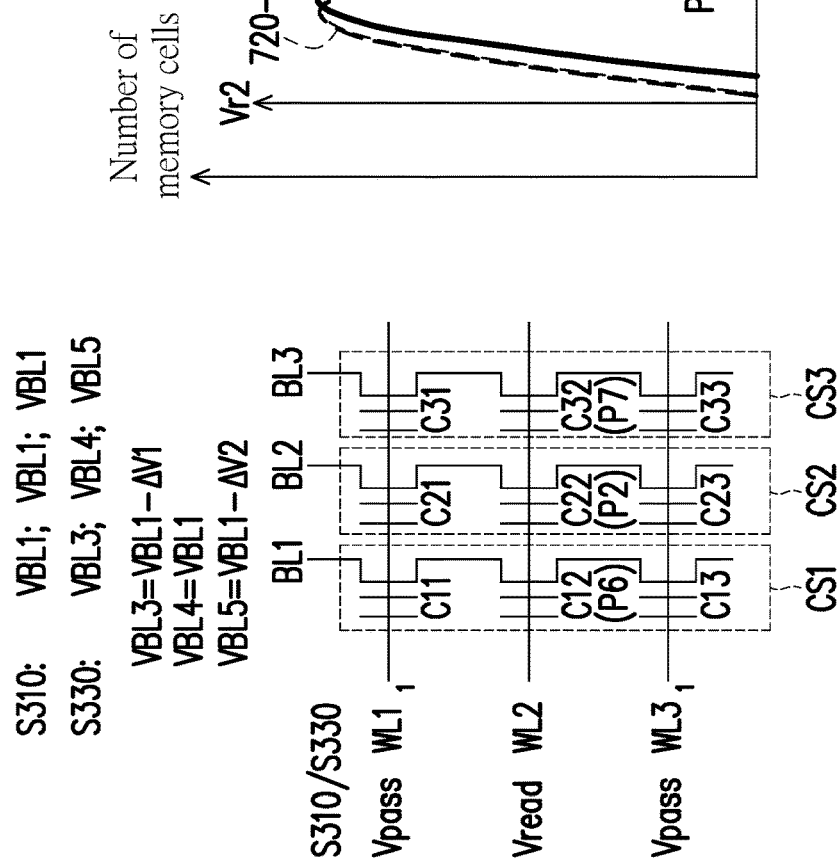
FIG. 6 is a schematic diagram of a part of a memory array in a memory device according to the second embodiment of the present disclosure.

FIG. 6 is a schematic diagram of a part of a memory array in a memory device according to the second embodiment of the present disclosure. FIG. 7 is a schematic diagram of a threshold voltage distribution curve corresponding to memory cells C12, C22, and C32 according to the second embodiment of the present disclosure. Please refer to FIG. 6 and FIG. 7 at the same time. In the second embodiment, the method of implementing the step S320 in FIG. 3 is as follows, that is, when the second read operation is performed, different bit line voltages VBL3 and VBL5 are applied to the first bit line BL1 and the third bit line BL3 respectively based on different groups of potential states respectively corresponding to memory cells C12, C22, and C32 (i.e., low-level group potential state LPS, middle-level group potential state MPS, and high-level group potential state HPS). Both the third bit line voltage VBL3 and the fifth bit line voltage VBL5 are lower than the first bit line voltage VBL1 of the first read operation, and the fourth bit line voltage VBL4 applied to the second bit line BL2 is equal to the first bit line voltage VBL1 of the first read operation. In other words, the third bit line voltage VBL3 is the first bit line voltage VBL1 minus the first voltage difference ΔV1; the fifth bit line voltage VBL5 is the first bit line voltage VBL1 minus the second voltage difference ΔV2. The third bit line voltage VBL3 and the fifth bit line voltage VBL5 are not equal to the first bit line voltage VBL1. Under the circumstances, the threshold voltages of the second memory cells C12 and C32 are increased.

In this embodiment, the memory cells C12, C22 and C32 are respectively set to the potential states P6, P2 and P7 as an example. It is known from experiments that when different potential states in TLC are subject to threshold voltage shifts, the threshold voltage distribution curve corresponding to each potential state is shifted by different amounts. Classified according to the amount of shift of the threshold voltage distribution curve corresponding to each potential state when the threshold voltage is shifted, the threshold voltage distribution curve corresponding to the middle-level group potential state MPS is shifted the least, it is even unnecessary to perform the step S320 in FIG. 3 to adjust the threshold voltage distribution curve. The threshold voltage distribution curves corresponding to the low-level group potential state LPS and the high-level group potential state HPS are shifted the most, and the threshold voltage distribution curves corresponding to the low-level group potential state LPS are shifted in a different direction from that of the threshold voltage distribution curves corresponding to the high-level group potential state HPS.

Based on the above, the second embodiment is applying different bit line voltages VBL3, VBL4 and VBL5 in the set of second bit line voltages to the first bit line BL1, the second bit line BL2 and the third bit line BL3 respectively based on the groups (i.e., the high-level group potential state HPS, the middle-level group potential state MPS, the high-level group potential state HPS) corresponding to the potential states P6, P2 and P7 respectively corresponding to the memory cells C12, C22 and C32. The third bit line voltage VBL3 and the fifth bit line voltage VBL5 are both lower than the first bit line voltage VBL1 of the first read operation. The fourth bit line voltage VBL4 is equal to the first bit line voltage VBL1.

In the second embodiment, because the potential state P2 corresponding to the memory cell C22 belongs to the aforementioned middle-level group potential state MPS, and the potential state P6 corresponding to the memory cell C12 and the potential state P7 corresponding to the memory cell C32 belong to the aforementioned high-level group potential state HPS, and the threshold voltage of the group potential state HPS is higher than the threshold voltage of the middle-level group potential state MPS, the third bit line voltage BVL3 and the fifth bit line voltage VBL5 in the set of second bit line voltages applied to the first bit line BL1 and the third bit line BL3 are both lower than the first bit line voltage VBL1, and the fourth bit line voltage VBL4 in the set of second bit line voltages applied to the second bit line BL2 is equal to the first bit line voltage VBL1. Moreover, the second memory cell C12 in the first memory cell string CS1 of the high-level group potential state HPS has a lower threshold voltage than the second memory cell C32 in the third memory cell string CS3 of the high-level group potential state HPS (shown in the second embodiment in FIG. 6), the third bit line voltage VBL3 is higher than the fifth bit line voltage VBL5, that is, the absolute value of the second voltage difference ΔV2 is greater than the absolute value of the first voltage difference ΔV1. In this way, the threshold voltage distribution curve of the second memory cell C12 in the first memory cell string CS1 and the threshold voltage distribution curve of the second memory cell C32 in the third memory cell string CS3 are improved. In this embodiment, the values of the voltage differences AV1 and AV2 may be obtained based on the experience of those who apply this embodiment and statistically compiled data, and the voltage difference may be obtained from the memory controller 110 of FIG. 1 by using lookup tables or other corresponding technologies, thereby performing the step S320 in FIG. 3.

The threshold voltage distribution curves 710-2, 710-6, and 710-7, which are used to present the initial threshold voltage and are solid lines in FIG. 7, are all located on the right side of the reference voltages Vr2, Vr6 and Vr7. However, after being shifted by the threshold voltage, some of the threshold voltage distribution curves 720-6 and 720-7 that belong to the high-level group potential state HPS and are dashed lines in FIG. 7 are located to the left of the reference voltages Vr6 and Vr7. In this embodiment, when the second read operation in the step S320 is implemented, the threshold voltage distribution curves of the second memory cells C12 and C32 (corresponding to the threshold voltage distribution curves 720-6 and 720-7 in FIG. 7) will be improved accordingly, for example gradually increased from the threshold voltage distribution curves 720-6 and 720-7 in FIG. 7 to the adjusted threshold voltage distribution curves 730-6 and 730-7 in FIG. 7. Under the circumstances, the adjusted threshold voltage distribution curves 730-6 and 730-7 are respectively located on the right side of the reference voltages Vr6 and Vr7. After being shifted by the threshold voltage, the threshold voltage distribution curve 720-2 belonging to the middle-level group potential state MPS and shown as a dashed line in FIG. 7 is still located on the right side of the reference voltage Vr2, so no adjustment is required.

Figure 9:
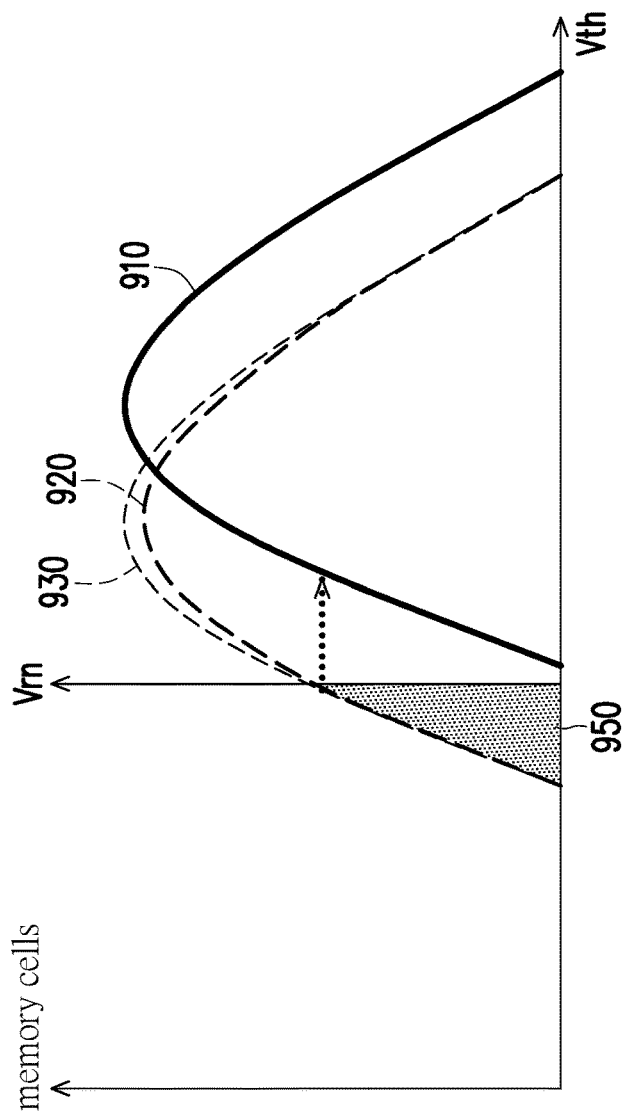
FIG. 9 is a schematic diagram of a threshold voltage distribution curve corresponding to memory cells C12, C22, and C32 according to the third embodiment of the present disclosure.
Figure 8:
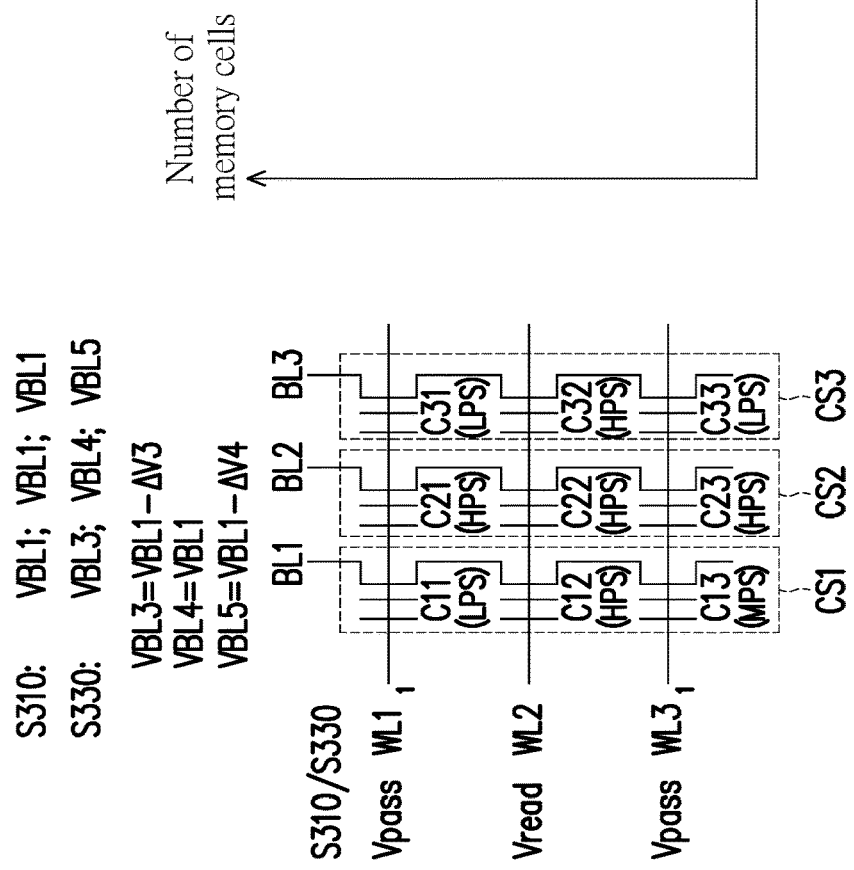
FIG. 8 is a schematic diagram of part of a memory array in a memory device according to the third embodiment of the present disclosure.

FIG. 8 is a schematic diagram of part of a memory array in a memory device according to a third embodiment of the present disclosure. FIG. 9 is a schematic diagram of the threshold voltage distribution curve corresponding to the memory cells C12, C22, and C32 according to the third embodiment of the present disclosure. Please refer to FIG. 8 and FIG. 9 at the same time. In the third embodiment, the method of implementing the step S320 in FIG. 3 is as follows, that is, when the second read operation is performed, different bit line voltages VBL3' and VBL5' are respectively applied to the first bit line BL1 and the third bit line BL3 based on the arrangement pattern of the potential states P0 to P7 corresponding to the first memory cell C11 to the third memory cell C33 in the first to third memory cell strings CS1 to CS3. The third bit line voltage VBL3' and the fifth bit line voltage VBL5' are both lower than the first bit line voltage VBL1.

Specifically, in the third embodiment, when the second memory cells C12, C22, and C32 in the first to third memory cell strings CS1 to CS3 are all in the high-level group potential state HPS, and the first memory cells C11, C21, and C31 and the third memory cells C13, C23 and C33 in the first memory cell string CS1 to the third memory cell string CS3 are in one of the middle-level group potential state MPS and the low-level group potential state LPS, the third bit line voltage VBL3' and the fifth bit line voltage VBL5' are both lower than the first bit line voltage VBL1, and the threshold voltage of the second memory cells C12~C32 in the first to third memory cell strings CS1 to CS3 will therefore be increased. In other words, the third bit line voltage VBL3' is the first bit line voltage VBL1 minus the third voltage difference ΔV3; the fifth bit line voltage VBL5' is the first bit line voltage VBL1 minus the fourth voltage difference ΔV4. The bit line voltages VBL3' and VBL5' are not equal to the first bit line voltage VBL1. In this embodiment, the values of the voltage differences AV3 and AV4 may be obtained based on the experience of those who apply this embodiment and statistically compiled data, and the aforementioned voltage difference may be obtained from the memory controller 110 of FIG. 1 by using a lookup table or other corresponding technologies, thereby performing the step S320 of FIG. 3.

In the third embodiment, the hierarchical groups to which the potential states corresponding to each memory cell belong are marked in FIG. 8, and it can be seen that the second memory cells C12, C22, and C32 all belong to the high-level group potential state HPS. Please refer to the second memory cell string CS2, since the memory cells C21, C22 and C23 also belong to the high-level group potential state HPS, the second memory cell C22 as one of the target memory cells is able to have better data retention ability, and because the threshold voltage values of memory cells C21 and C23 are also high, the data retained in the second memory cell C22 is easy to save. Please refer to the first memory cell string CS1, since the memory cell C11 belongs to the low-level group potential state LPS and the memory cell C13 belongs to the middle-level group potential state MPS, the second memory cell C12 serving as one of the target memory cells has a medium retention loss, because the data retained in the second memory cell C12 may be lost to the memory cells C11 and C13. Please refer to the third memory cell string CS3, since the memory cells C31 and C33 belong to the low-level group potential state LPS, the second memory cell C32 serving as one of the target memory cells has more retention loss, because the data retained in the second memory cell C32 may be easily lost to memory cells C31 and C33.

The threshold voltage distribution curve 910 in FIG. 9 that is a solid line to present the initial threshold voltage is located on the right side of the reference voltage Vrn. However, some of the threshold voltage distribution curve 920 in FIG. 9, which is a dashed line after being shifted by the threshold voltage, is on the left side of the reference voltage Vrn. In this embodiment, when the second read operation in step S320 is performed, the threshold voltage distribution curves of the second memory cells C12 and C32 (corresponding to the threshold voltage distribution curve 920 in FIG. 9) will therefore be improved to the adjusted threshold voltage distribution curve 930 in FIG. 9. In this embodiment, the memory controller 110 of FIG. 1 may also read the block 950 in the threshold voltage distribution curve 920 and invert the data read by the block 950 to obtain the correct data, thereby obtaining the correct data of the second memory cell C22 serving as the target memory cell.

Figure 11:
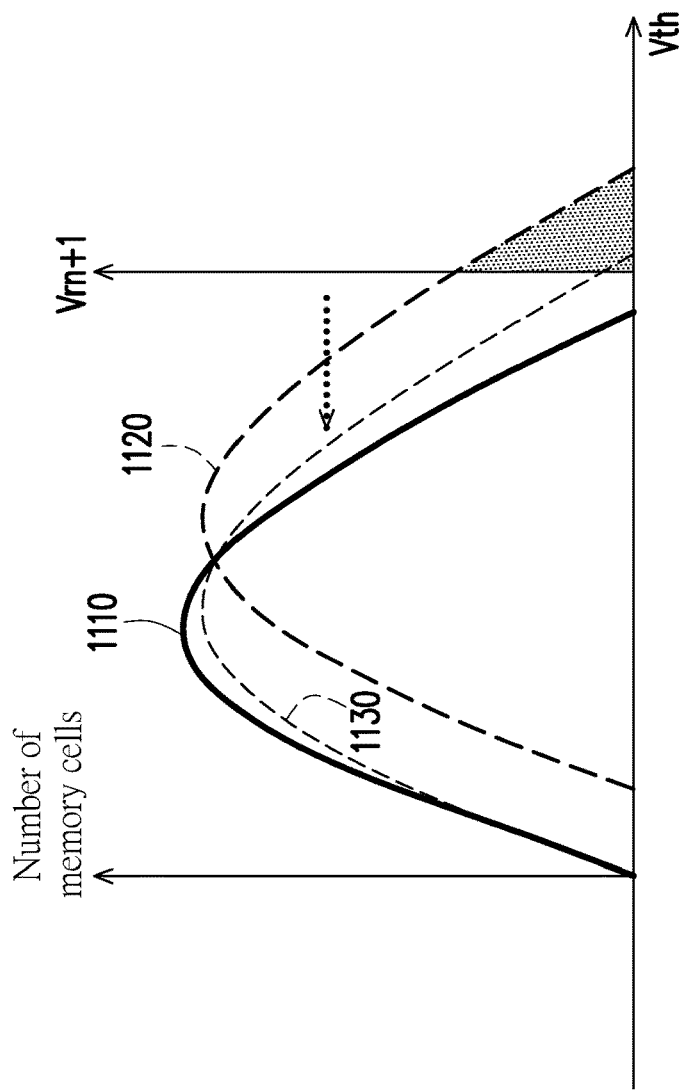
FIG. 11 is a schematic diagram of a threshold voltage distribution curve corresponding to memory cells C12, C22, and C32 according to the fourth embodiment of the present disclosure.
Figure 10:
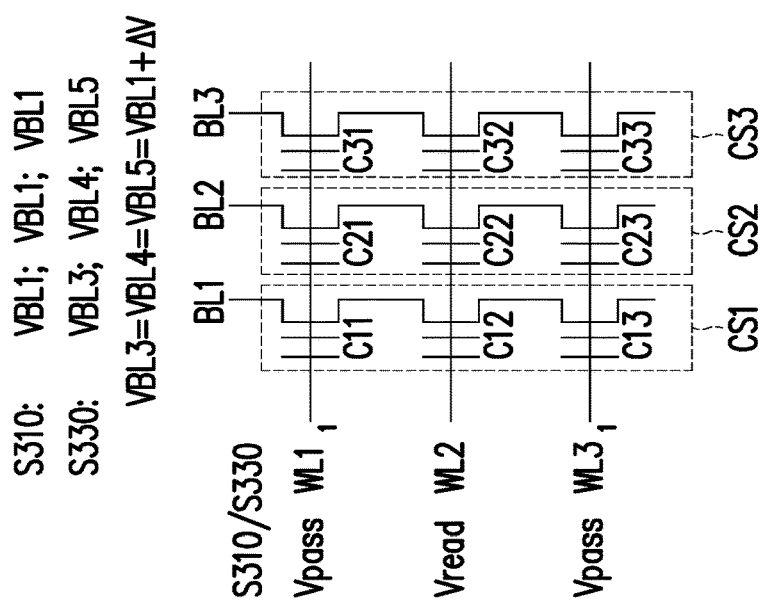
FIG. 10 is a schematic diagram of part of a memory array in a memory device according to the fourth embodiment of the present disclosure.

FIG. 10 is a schematic diagram of part of a memory array in a memory device according to the fourth embodiment of the present disclosure. FIG. 11 is a schematic diagram of a threshold voltage distribution curve corresponding to memory cells C12, C22, and C32 according to the fourth embodiment of the present disclosure. The fourth embodiment of the present disclosure is similar to the aforementioned first embodiment. The difference lies in that when the threshold voltage distribution curve is adjusted, voltages (i.e., the third bit line voltage VBL3, the fourth bit line voltage VBL4, and the fifth bit line voltage VBL5) in the set of second bit line voltages uniformly applied to the bit lines B1, BL2, and BL3 are all the same. Moreover, each voltage in the set of second bit line voltages is higher than the first bit line voltage VBL1. In other words, taking the third bit line voltage VBL3 as an example, the third bit line voltage VBL3 is the first bit line voltage VBL1 plus the voltage difference ΔV. The third bit line voltage VBL3 is not equal to the first bit line voltage VBL1. In the foregoing situation, the threshold voltage of the second memory cell C22 in the second memory cell string CS2 is lowered due to step S320, and the threshold voltages of the memory cells C12 and C32 are also lowered.

In FIG. 11, the threshold voltage distribution curve 1110 used to present the initial threshold voltage and illustrated as a solid line is located on the left side of the reference voltage Vrn+1. However, in FIG. 11, after being shifted by the threshold voltage and illustrated as a dashed line, some of the threshold voltage distribution curve 1120 is located on the right side of the reference voltage Vrn+1. In this embodiment, when the second read operation is performed in step S320, the voltages of the word lines WL1 to WL3 are the same as the voltages when the read operation is performed in step S310, and the bit lines BL1 to BL3 are adjusted, thereby adjusting the threshold voltages of the second memory cells C12, C22, and C32. In this case, the threshold voltage distribution curves of the second memory cells C12, C22, and C32 (corresponding to the threshold voltage distribution curve 1120 in FIG. 5) will be reduced, for example, gradually reduced from the threshold voltage distribution curve 1120 in FIG. 11 to the adjusted threshold voltage distribution curve 1130 in FIG. 5. Under the circumstances, the adjusted threshold voltage distribution curve 1130 is located on the left side of the reference voltage Vrn+1. Step S320 of this embodiment may be executed multiple times to gradually adjust the threshold voltages of the second memory cells C12, C22, and C32 until they approach the threshold voltage distribution curve 1130 of FIG. 5 to make the read operation in repeatedly performed step S310 to be successful. The value of the voltage difference ΔV in this embodiment may be obtained based on the experience of those who apply this embodiment and statistically compiled data.

Figure 13:
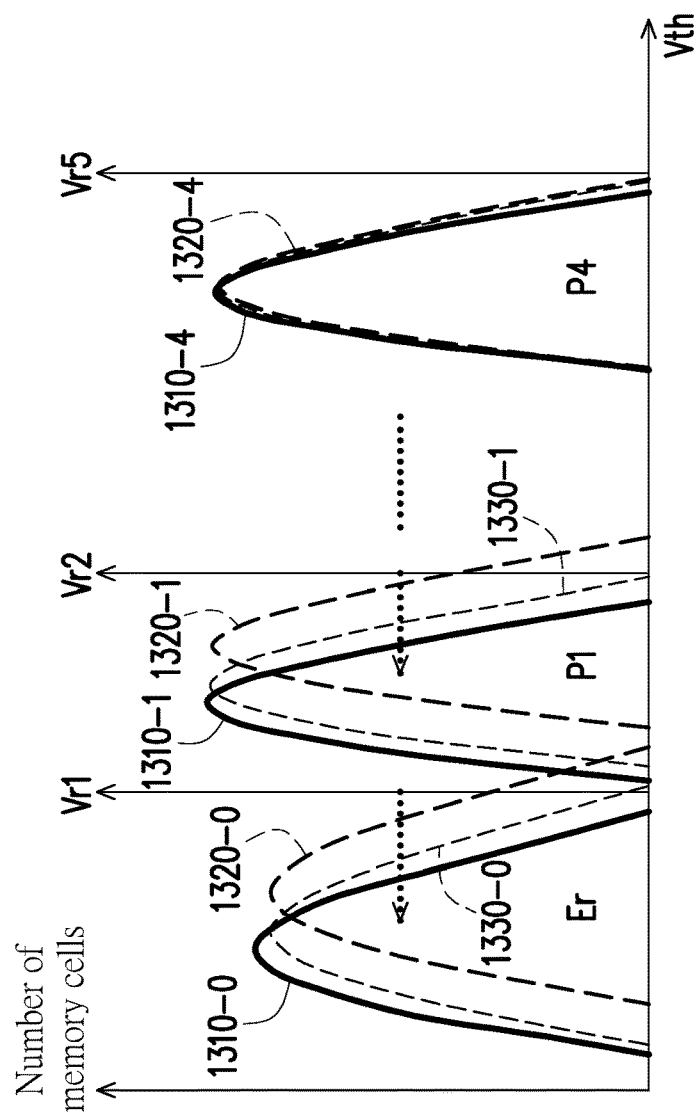
FIG. 13 is a schematic diagram of a threshold voltage distribution curve corresponding to memory cells C12, C22, and C32 according to the fifth embodiment of the present disclosure.
Figure 12:
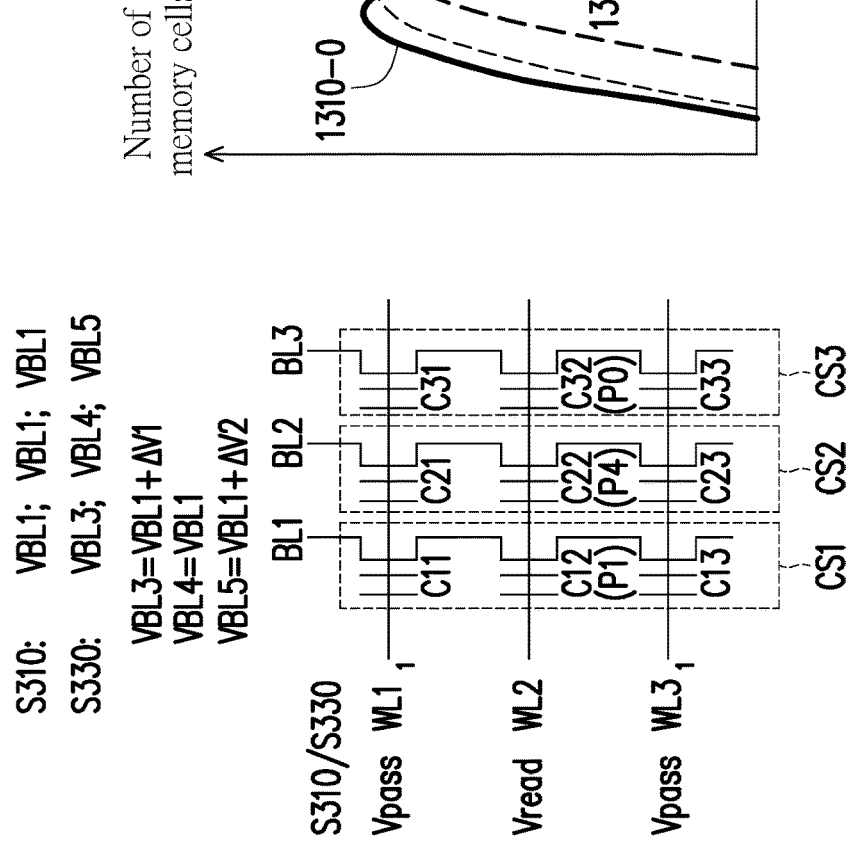
FIG. 12 is a schematic diagram of part of a memory array in a memory device according to the fifth embodiment of the present disclosure.

FIG. 12 is a schematic diagram of part of a memory array in a memory device according to the fifth embodiment of the present disclosure. FIG. 13 is a schematic diagram of a threshold voltage distribution curve corresponding to memory cells C12, C22, and C32 according to the fifth embodiment of the present disclosure. The fifth embodiment of the present disclosure is similar to the aforementioned second embodiment. The difference lies in that when the threshold voltage distribution curve is adjusted, the bit line voltages VBL3 and VBL5 respectively applied to the bit lines BL1 and BL3 based on the potential states respectively corresponding to the memory cells C12, C22, and C32 are higher than the first bit line voltage VBL1. In other words, the third bit line voltage VBL3 is the first bit line voltage VBL1 plus the voltage difference ΔV1, the fourth bit line voltage VBL4 is equal to the first bit line voltage VBL1, and the fifth bit line voltage VBL5 is the first bit line voltage VBL5 plus the voltage difference ΔV2. The bit line voltages VBL3 and VBL5 are not equal to the first bit line voltage VBL1. Under the foregoing circumstances, the threshold voltages of the second memory cells C12 and C32 are lowered.

In this embodiment, the memory cells C12, C22, and C32 are respectively set as potential states P1, P4, and P0 for illustration. In the fifth embodiment, because the potential state P4 corresponding to the memory cell C22 belongs to the aforementioned middle-level group potential state MPS, and the potential state P0 corresponding to the memory cell C12 and the potential state P1 corresponding to the memory cell C32 belong to the aforementioned low-level group potential state LPS, the threshold voltage of the low-level group potential state LPS is lower than the threshold voltage of the group potential state MPS. Therefore, the third bit line voltage VBL3 and the fifth bit line voltage VBL5 in the set of second bit line voltages applied to the first bit line BL1 and the third bit line BL3 are both higher than the first bit line voltage VBL1, and the fourth bit line voltage VBL4 in the set of second bit line voltages applied to the second bit line BL2 is equal to the first bit line voltage VBL1. In this way, the threshold voltage of the second memory cell C12 in the first memory cell string CS1 and the threshold voltage of the second memory cell C32 in the third memory cell string CS3 are reduced.

The second memory cell C12 in the first memory cell string CS1 of the low-level group potential state LPS has a higher threshold voltage than the second memory cell C32 in the third memory cell string CS3 in the low-level group potential state LPS (that is, the fifth embodiment as shown in FIG. 12), and the third bit line voltage VBL3 is lower than the fifth bit line voltage VBL5, that is, the absolute value of the second voltage difference ΔV2 is larger than the absolute value of the first voltage difference ΔV1. In this way, the threshold voltage distribution curve of the second memory cell C12 in the first memory cell string CS1 and the threshold voltage distribution curve of the second memory cell C32 in the third memory cell string CS3 are lowered. In this embodiment, the values of the voltage differences ΔV1 and ΔV2 may be obtained based on the experience of those who apply this embodiment and statistically compiled data, and the voltage difference may be obtained from the memory controller 110 of FIG. 1 by using lookup tables or other corresponding technologies, thereby performing step S320 in FIG. 3.

The threshold voltage distribution curves 1310-0, 1310-1, and 1310-4 used to present the initial threshold voltage and are solid lines in FIG. 13 are all located on the left side of the reference voltages Vr1, Vr2, and Vr5 respectively. However, after being shifted by the threshold voltage, some of the threshold voltage distribution curves 1320-0 and 1320-1 that belong to the low-level group potential state LPS and are dashed lines in FIG. 13 are located on the right side of the reference voltages Vr1 and Vr2. In this embodiment, when the second read operation in step S320 is performed, the threshold voltage distribution curves of the second memory cells C12 and C32 (corresponding to the threshold voltage distribution curves 1320-1 and 1320-0 of FIG. 13) will be reduced accordingly, for example, gradually decreased from the threshold voltage distribution curves 1320-0 and 1320-1 in FIG. 13 to the adjusted threshold voltage distribution curves 1330-0 and 1330-1 in FIG. 13. Under the circumstances, the adjusted threshold voltage distribution curves 1330-0 and 1330-1 are respectively located on the left side of the reference voltages Vr1 and Vr2. After being shifted by the threshold voltage, the threshold voltage distribution curve 1320-4 in FIG. 13, which belongs to the middle-level group potential state MPS and is illustrated as a dashed line, is still located on the left side of the reference voltage Vr5, so no adjustment is needed.

Figure 15:
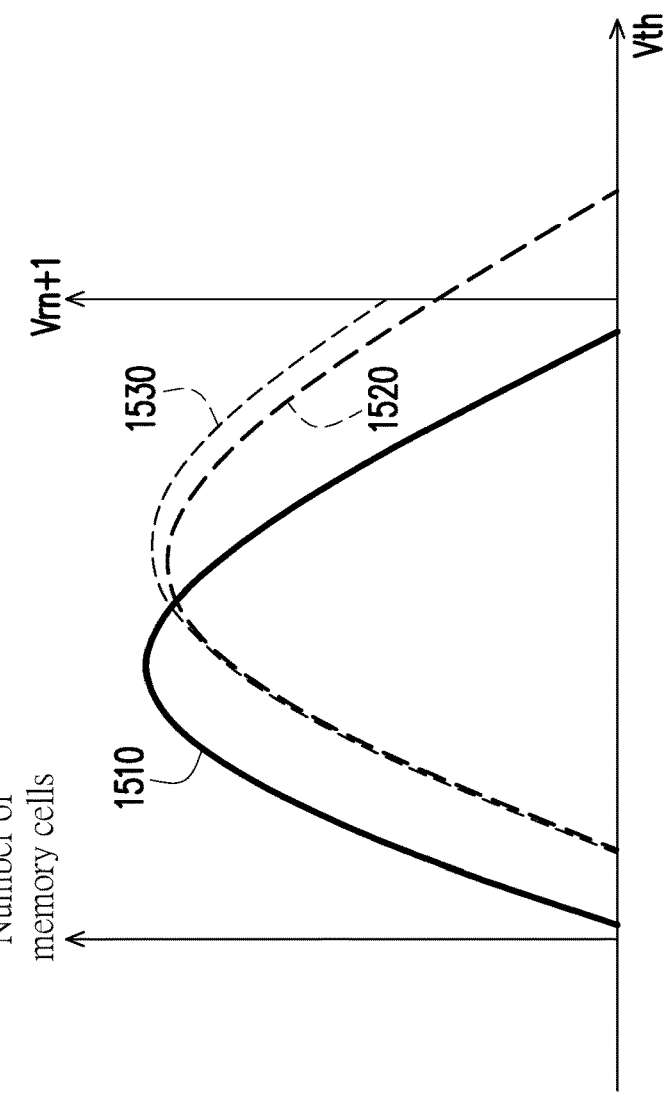
FIG. 15 is a schematic diagram of a threshold voltage distribution curve corresponding to memory cells C12, C22, and C32 according to the sixth embodiment of the present disclosure.
Figure 14:
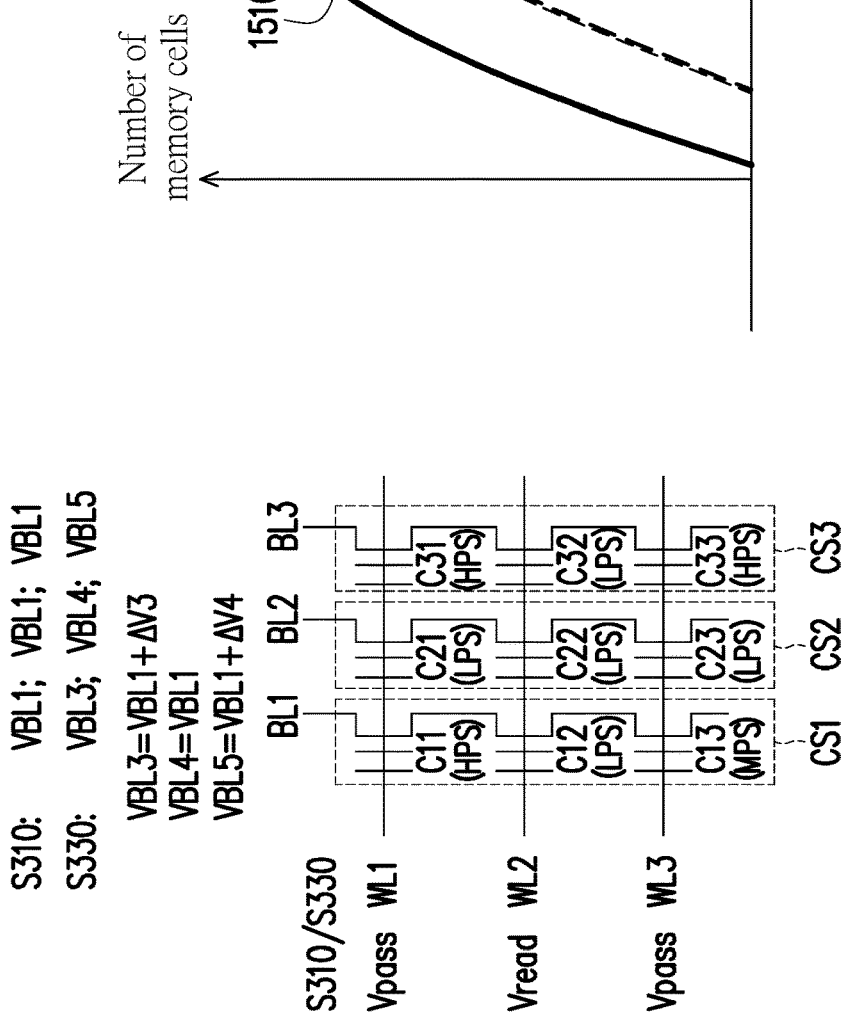
FIG. 14 is a schematic diagram of part of a memory array in a memory device according to the sixth embodiment of the present disclosure.

FIG. 14 is a schematic diagram of part of a memory array in a memory device according to the sixth embodiment of the present disclosure. FIG. 15 is a schematic diagram of a threshold voltage distribution curve corresponding to memory cells C12, C22, and C32 according to the sixth embodiment of the present disclosure. The sixth embodiment of the present disclosure is similar to the aforementioned third embodiment, the difference lies in that, when the threshold voltage distribution curve is adjusted, the bit line voltages VBL3, VBL4 and VBL5 are respectively applied to the bit lines BL1, BL2 and BL3 based on the arrangement pattern of the potential states P0 to P7 corresponding to the first to third memory cells C11 to C33 in the first to third memory cell strings CS1 to CS3, and the bit line voltages VBL3 and VBL5 are higher than the first bit line voltage VBL1. In other words, the third bit line voltage VBL3 is the first bit line voltage VBL1 plus the voltage difference ΔV3, and the fifth bit line voltage VBL5 is the first bit line voltage VBL1 plus the voltage difference ΔV4. The fourth bit line voltage VBL4 is equal to the first bit line voltage VBL1. The bit line voltages VBL3 and VBL5 are not equal to the first bit line voltage VBL1. Under the aforementioned circumstances, the threshold voltages of the second memory cells C12 and C32 are decreased.

In detail, in the sixth embodiment, when the second memory cells C12, C22, and C32 in the first memory cell string CS1 to the third memory cell string CS3 are all in the low-level group potential state LPS, and the first memory cells C11, C21, C31 and the third memory cells C13, C23, C33 in the first memory cell string CS1 to the third memory cell string CS3 are in one of the middle-level group potential state MPS and the high-level group potential state HPS, the third bit line voltage VBL3 and the fifth bit line voltage VBL5 are larger than the first bit line voltage VBL1, and the threshold voltages of the second memory cells C12~C32 in the first memory cell string CS1 to the third memory cell string CS3 will therefore be reduced. In this embodiment, the values of the voltage differences AV3 and AV4 may be obtained based on the experience of those who apply this embodiment and statistically compiled data, and the voltage difference may be obtained from the memory controller 110 of FIG. 1 by using lookup tables or other corresponding technologies, thereby performing step S320 in FIG. 3.

In the sixth embodiment, the hierarchical group to which the potential state corresponding to each memory cell belongs is marked in FIG. 14. It can be seen that the second memory cells C12, C22, and C32 all belong to the low-level group potential state LPS. Please see the second memory cell string CS2. Since the memory cells C21 and C23 also belong to the low-level group potential state LPS, the second memory cell C22 serving as one of the target memory cells is able to have better data retention ability. Because the threshold voltage values of the memory cells C21 and C23 are also lower, the data stored in the second memory cell C22 is easy to be retained. Please see the first memory cell string CS1. Since the memory cell C11 belongs to the high-level group potential state HPS and the memory cell C13 belongs to the middle-level group potential state MPS, the second memory cell C12 serving as one of the target memory cells has a medium retention loss. The data retained in the second memory cell C22 may be affected by the charge loss of the memory cells C21 and C23. Please see the third memory cell string CS3. Since memory cells C31 and C33 both belong to the high-level group potential state HPS, the second memory cell C32 serving as one of the target memory cells has more retention loss. The data retained in the second memory cell C32 may be seriously affected by the potential state of the memory cells C31 and C33.

The threshold voltage distribution curve 1510 in FIG. 15 used to present the initial threshold voltage and illustrated as a solid line is located on the left side of the reference voltage Vrn+1. However, in FIG. 15, after being shifted by the threshold voltage, some of the threshold voltage distribution curve 1520 illustrated in a dashed line is located on the right side of the reference voltage Vrn+1. In this embodiment, when the second read operation is performed in step S320, the threshold voltage distribution curves of the second memory cells C12 and C32 (corresponding to the threshold voltage distribution curve 1520 in FIG. 15) will therefore be improved to the adjusted threshold voltage distribution curve 1530 in FIG. 15.

Figure 16:
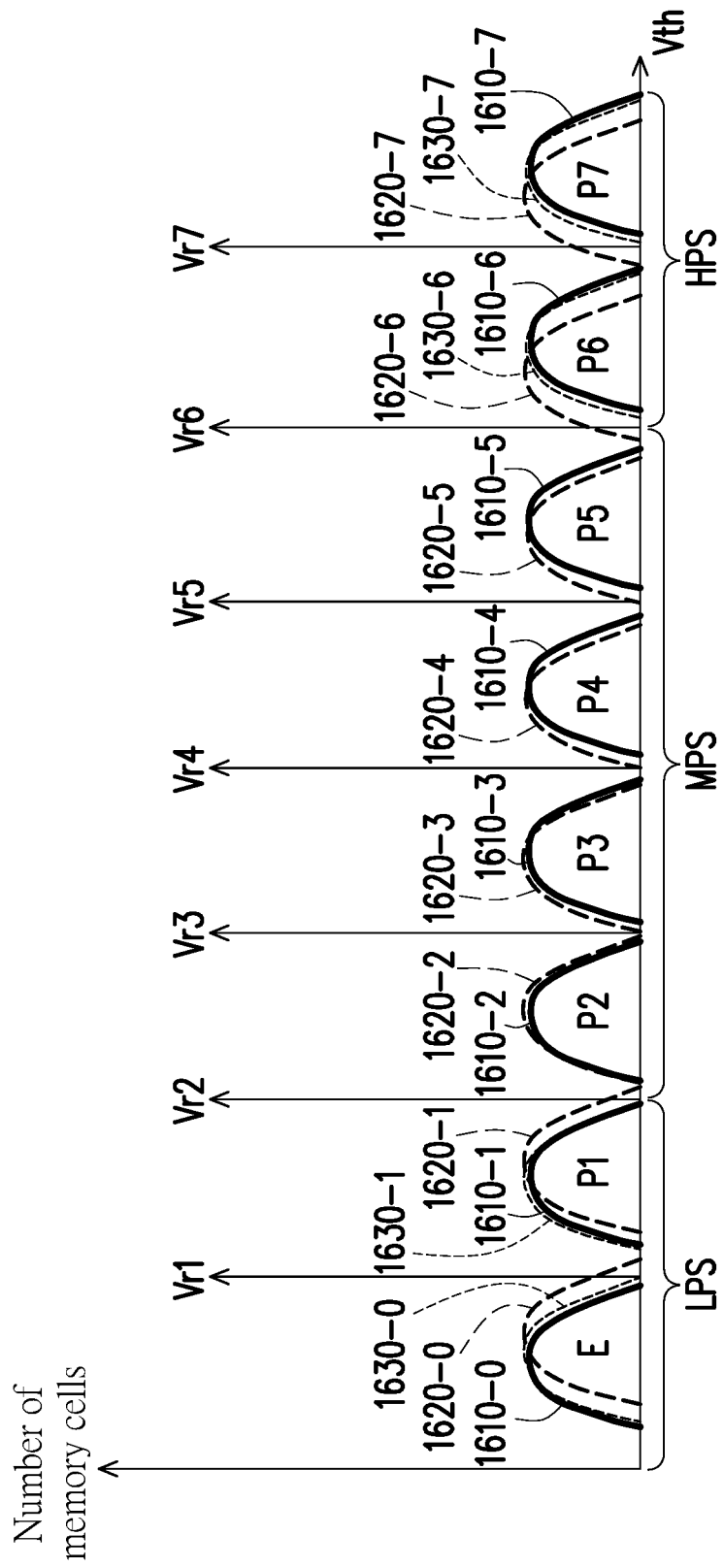
FIG. 16 is a schematic diagram of a threshold voltage distribution curve corresponding to various potential states Er and P1~P7 in TLC before and after the initial threshold voltage and the adjustment of the threshold voltage distribution curve according to an embodiment of the present disclosure.

FIG. 16 is a schematic diagram of a threshold voltage distribution curve corresponding to various potential states Er and P1~P7 in TLC before and after the initial threshold voltage and the adjustment of the threshold voltage distribution curve according to an embodiment of the present disclosure. It can be seen from FIG. 16 that the threshold voltage distribution curves 1610-0~1610-7 are the distribution corresponding to the initial threshold voltage; the threshold voltage distribution curves 1620-0~1620-7 are the distribution after being shifted by the threshold voltage; the threshold voltage distribution curves 1630-0~1630-7 are distribution curves after being moved through the embodiments of the present disclosure.

Based on the above, the memory device and the read method therefor described in the embodiments of the present disclosure determine whether the data retention function of the target memory cells is normal through the first read operation, and when the first read operation fails, bit line voltages of the target memory cells and adjacent memory cells are changed by performing a second read operation, so as to adjust the threshold voltage distribution curve in the target memory cells and increase the success rate of the first read operation, thereby improving data reliability of the non-volatile memory device (e.g., flash memory).

What is claimed is:
1. A read method for a memory device, the memory device comprising: a first memory cell string, a second memory cell string, and a third memory cell string, wherein the second memory cell string is between the first memory cell string and the third memory cell string, each of the first memory cell string, the second memory cell string, and the third memory cell string comprises a first memory cell, a second memory cell, and a third memory cell connected in series, wherein the second memory cell is between the first memory cell and the third memory cell, the read method comprising:
  performing a first read operation to the memory device comprising:
    applying a first bit line voltage to a first bit line, a second bit line and a third bit line, wherein the first bit line, the second bit line and the third bit line are respectively connected to the first memory cell string, the second memory cell string, and the third memory cell string; and
  in response to a failure of the first read operation, performing a second read operation of the memory device comprising:
    applying a set of second bit line voltages to the first bit line, the second bit line and the third bit line respectively, wherein the set of second bit line voltages comprises a third bit line voltage, a fourth bit line voltage and a fifth bit line voltage respectively applied to the first bit line, the second bit line and the third bit line, and the third bit line voltage and the fifth bit line voltage are different from the first bit line voltage.

2. The read method for the memory device according to claim 1, further comprising:
  in the first read operation, applying a read voltage to a second word line connected to the second memory cell in each of the memory cell strings;
  in the first read operation, applying a pass voltage to a first word line and a third word line respectively connected to the first memory cell and the third memory cell in each of the memory cell strings;
  in the second read operation, applying the read voltage to the second word line connected to the second memory cell in each of the memory cell strings; and
  in the second read operation, applying the pass voltage to the first word line and the third word line respectively connected to the first memory cell and the third memory cell in each of the memory cell strings.

3. The read method for the memory device according to claim 1, wherein the third bit line voltage, the fourth bit line voltage and the fifth bit line voltage are equal, wherein the third bit line voltage, the fourth bit line voltage and the fifth bit line voltage are lower than or higher than the first bit line voltage.

4. The read method for the memory device according to claim 1, wherein both the second memory cell in the first memory cell string and the second memory cell in the third memory cell string are in a first group potential state,
  the second memory cell in the second memory cell string is in a second group potential state, and the first group potential state and the second group potential state have different threshold voltages.

5. The read method for the memory device according to claim 4, wherein the threshold voltage of the first group potential state is higher than the threshold voltage of the second group potential state, the third bit line voltage and the fifth bit line voltage in the set of second bit line voltages applied to the first bit line and the third bit line respectively are both lower than the first bit line voltage, and the fourth bit line voltage in the set of second bit line voltages applied to the second bit line is equal to the first bit line voltage.

6. The read method for the memory device according to claim 4, wherein the second memory cell in the first memory cell string of the first group potential state has a lower threshold voltage than the second memory cell in the third memory cell string of the first group potential state, and the third bit line voltage applied to the first bit line is higher than the fifth bit line voltage applied to the third bit line.

7. The read method for the memory device according to claim 4, wherein the threshold voltage of the first group potential state is lower than the threshold voltage of the second group potential state, and the third bit line voltage and the fifth bit line voltage in the set of second bit line voltages applied to the first bit line and the third bit line respectively are both higher than the first bit line voltage, and the fourth bit line voltage in the set of second bit line voltages applied to the second bit line is equal to the first bit line voltage.

8. The read method for the memory device according to claim 7, wherein the second memory cell in the first memory cell string of the first group potential state has a higher threshold voltage than the second memory cell in the third memory cell string of the first group potential state, and the third bit line voltage applied to the first bit line is lower than the fifth bit line voltage applied to the third bit line.

9. The read method for the memory device according to claim 2, wherein the second memory cells in the first memory cell string to the third memory cell string are all in a first group potential state,
  the first memory cell and the third memory cell in the first memory cell string to the third memory cell string are in one of a second group potential state and a third group potential state, and the first group potential state, the second group potential state and the third group potential state have different threshold voltages.

10. The read method for the memory device according to claim 9, wherein the threshold voltage of the first group potential state is higher than the threshold voltage of the second group potential state, and the threshold voltage of the second group potential state is higher than the threshold voltage of the third group potential state, the third bit line voltage and the fifth bit line voltage in the set of second bit line voltages applied to the first bit line and the third bit line respectively are both lower than the first bit line voltage, and the fourth bit line voltage in the set of second bit line voltages applied to the second bit line is equal to the first bit line voltage.

11. The read method for the memory device according to claim 9, wherein the first memory cell in the first memory cell string of the third group potential state has a lower threshold voltage than the third memory cell in the first memory cell string of the second group potential state, the first memory cell and the third memory cell in the third memory cell string are in the third group potential state, and the third bit line voltage applied to the first bit line is higher than the fifth bit line voltage applied to the third bit line.

12. The read method for the memory device according to claim 9, wherein the threshold voltage of the first group potential state is lower than the threshold voltage of the second group potential state, and the threshold voltage of the second group potential state is lower than the threshold voltage of the third group potential state, the third bit line voltage and the fifth bit line voltage in the set of second bit line voltages applied to the first bit line and the third bit line respectively are both higher than the first bit line voltage, and the fourth bit line voltage in the set of second bit line voltages applied to the second bit line is equal to the first bit line voltage.

13. The read method for the memory device according to claim 9, wherein the first memory cell in the first memory cell string of the third group potential state has a higher threshold voltage than the third memory cell in the first memory cell string of the second group potential state, the first memory cell and the third memory cell in the third memory cell string are in the third group potential state, and the third bit line voltage applied to the first bit line is lower than the fifth bit line voltage applied to the third bit line.

14. A memory device, comprising:
 a memory array, comprising a first memory cell string, a second memory cell string, and a third memory cell string, wherein the second memory cell string is between the first memory cell string and the third memory cell string, each of the first memory cell string, the second memory cell string and the third memory cell string comprises a first memory cell, a second memory cell and a third memory cell connected in series, wherein the second memory cell is between the first memory cell and the third memory cell; and
 a memory controller, which is configured to control the memory array,
 the memory controller is configured to perform:
 a first read operation of the memory device, and the first read operation comprising:
   applying a first bit line voltage to a first bit line, a second bit line and a third bit line, wherein the first bit line, the second bit line and the third bit line are respectively connected to the first memory cell string, the second memory cell string and the third memory cell string; and
 in response to a failure of the first read operation, perform a second read operation of the memory device comprising:
   applying a set of second bit line voltages to the first bit line, the second bit line and the third bit line respectively, wherein the set of second bit line voltages comprises a third bit line voltage, a fourth bit line voltage, and a fifth bit line voltage respectively applied to the first bit line, the second bit line and the third bit line, and the third bit line voltage and the fifth bit line voltage are different from the first bit line voltage.

15. The memory device according to claim 14, wherein the memory controller is further configured to:
 in the first read operation, apply a read voltage to a second word line connected to the second memory cell in each of the memory cell strings;
 in the first read operation, apply a pass voltage to a first word line and a third word line respectively connected to the first memory cell and the third memory cell in each of the memory cell strings;
 in the second read operation, apply the read voltage to the second word line connected to the second memory cell in each of the memory cell strings; and
 in the second read operation, apply the pass voltage to the first word line and the third word line respectively connected to the first memory cell and the third memory cell in each of the memory cell strings.

16. The memory device according to claim 14, wherein the third bit line voltage, the fourth bit line voltage and the fifth bit line voltage applied to the first bit line, the second bit line and the third bit line are equal, wherein the third bit line voltage, the fourth bit line voltage and the fifth bit line voltage are lower than or higher than the first bit line voltage.

17. The memory device according to claim 14, wherein both the second memory cell in the first memory cell string and the second memory cell in the third memory cell string are in a first group potential state,
 the second memory cell in the second memory cell string is in a second group potential state, and the first group potential state and the second group potential state have different threshold voltages.

18. The memory device according to claim 17, wherein the threshold voltage of the first group potential state is higher than the threshold voltage of the second group potential state, the third bit line voltage and the fifth bit line voltage in the set of second bit line voltages applied to the first bit line and the third bit line respectively are both lower than the first bit line voltage, and the fourth bit line voltage in the set of second bit line voltages applied to the second bit line is equal to the first bit line voltage.

19. The memory device according to claim 14, wherein
 wherein the second memory cells in the first memory cell string to the third memory cell string are all in a first group potential state,
 the first memory cell and the third memory cell in the first memory cell string to the third memory cell string are in one of a second group potential state and a third group potential state, and the first group potential state, the second group potential state and the third group potential state have different threshold voltages.

20. The memory device according to claim 19, wherein the threshold voltage of the first group potential state is higher than the threshold voltage of the second group potential state, and the threshold voltage of the second group potential state is higher than the threshold voltage of the third group potential state, the third bit line voltage and the fifth bit line voltage in the set of second bit line voltages applied to the first bit line and the third bit line respectively are both lower than the first bit line voltage, and the fourth bit line voltage in the set of second bit line voltages applied to the second bit line is equal to the first bit line voltage.

* * * * *